C. H. CLARK.
HOE.
APPLICATION FILED JUNE 9, 1920. RENEWED MAR. 2, 1922.
1,428,680.
Patented Sept. 12, 1922.
2 SHEETS—SHEET 2.
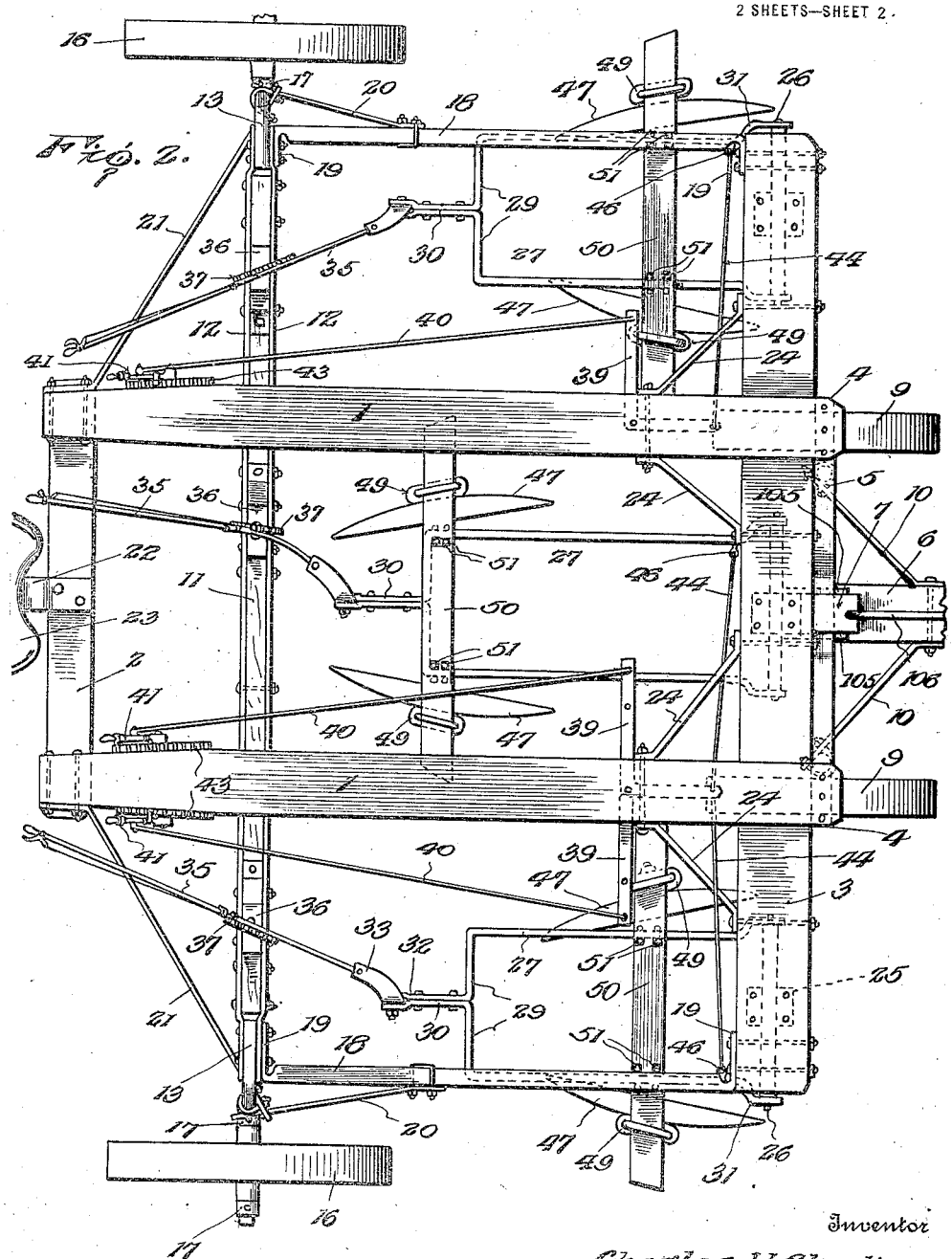

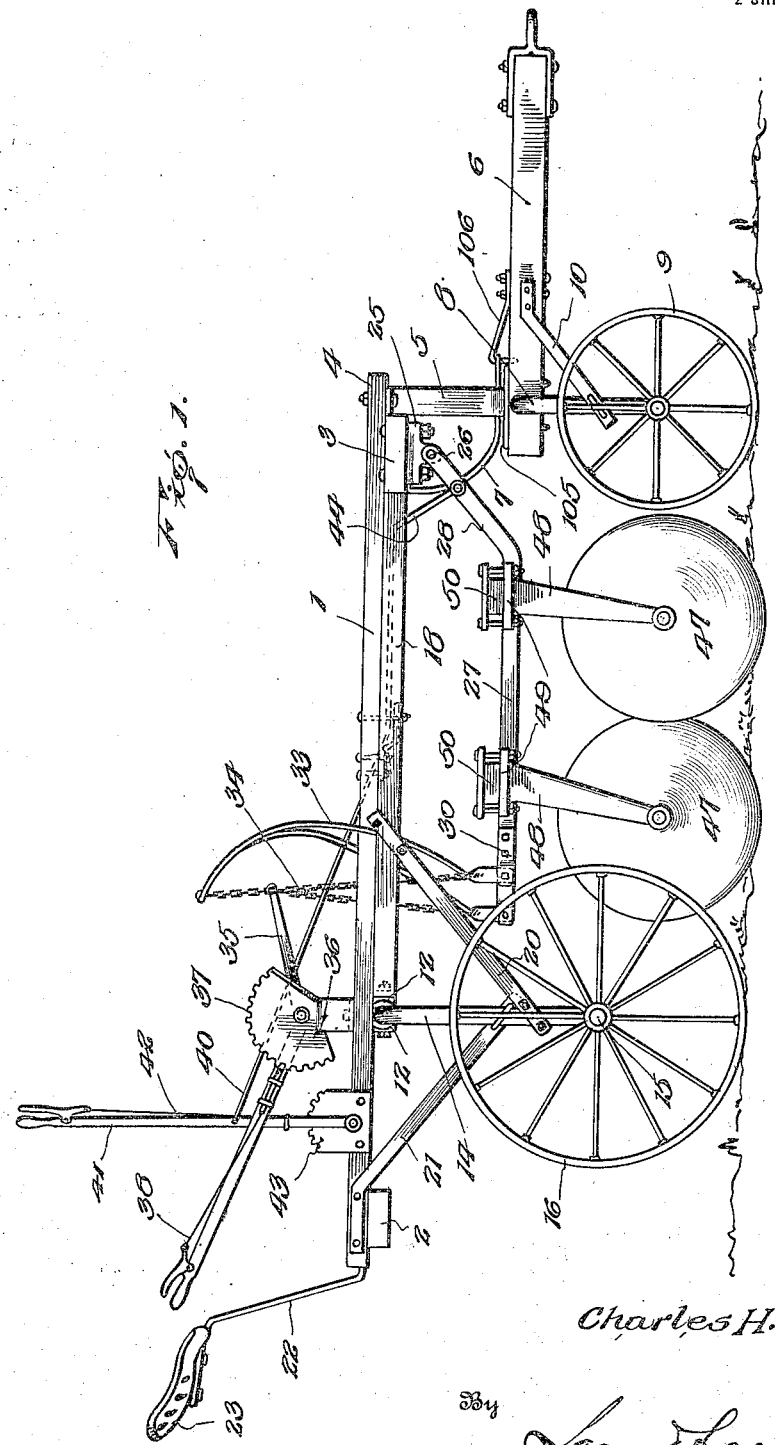

Patented Sept. 12, 1922.

1,428,680

UNITED STATES PATENT OFFICE.

CHARLES H. CLARK, OF EASTON, MAINE.

HOE.

Application filed June 9, 1920, Serial No. 387,707. Renewed March 2, 1922. Serial No. 540,614.

*To all whom it may concern:*

Be it known that I, CHARLES H. CLARK, a citizen of the United States, residing at Easton, in the county of Aroostook and State of Maine, have invented certain new and useful Improvements in Hoes, of which the following is a specification.

This invention relates to agricultural implements of the general type disclosed in Letters Patent No. 1,266,918, granted to me May 21, 1918, one object of the present invention being to provide a machine which may be caused to act upon three rows of plants at one time. Another object of the invention is to provide means whereby rigid blades or shovels may be employed or cultivator disks may be used as may be desired, and the invention seeks generally to improve the construction and arrangement of the several parts of the machine to the end that the durability of the machine and its efficiency may be increased without any considerable increase in the cost of manufacture.

The invention is illustrated in the accompanying drawings, in which—

Figure 1 is a side elevation of the improved machine;

Fig. 2 is a plan view thereof;

In carrying out my invention, I employ a main frame consisting of side bars 1, the rear ends of which are connected by a cross beam 2 and the front ends of which are connected by a cross beam 3 which projects laterally beyond the side bars, as clearly shown in Fig. 2. The forward extremities of the side bars project somewhat beyond the cross beam 3, as shown at 4 in Fig. 2, and to these projecting extremities I secure an inverted arch or bolster 5, the central portion of which rests upon a wear plate 105 secured to the upper side of the draft tongue or pole 6 over the axle. The rear end of a longitudinal brace 7 is bolted to the cross beam 3 at the center of the same and this brace extends downwardly and forwardly over the bolster 5 to which it is welded. Upon the upper side of the tongue is secured a draft hook 106 the rear end of which passes through and pivotally engages the front end of the brace 7 to connect said brace with the tongue. An arched axle 8 is secured in or to the tongue 6 and ground wheels 9 are mounted for free rotation upon the extremities of this axle so as to support the weight of the front end of the machine and thereby relieve the necks of draft animals when a team is employed to haul the machine and also facilitate the travel of the machine over the field. Braces 10 are secured to the vertically disposed side portions of the axle 8 and the front ends of these braces are secured to the sides of the tongue 6 thereby firmly supporting the axle against any tendency to swing rearwardly and permit the front end of the machine to drop. The tongue 6 is equipped with a coupling or other means whereby the machine may be drawn over the field by draft animals or by a tractor as may be preferred. The wheels 9 will run at opposite sides of the middle row of plants and will, therefore, not come in contact with and injure the plants.

To the side bars 1, near the rear ends thereof, I secure a beam 11 which will preferably be a wooden bar reinforced by metallic plates or straps 12 secured to its front and rear sides, the extremities of the said straps or plates being extended beyond the ends of the bar 11 and curved or dished, so as to fit closely around the upper horizontal portions 13 of the rear axles. The said rear axles comprise vertical spindles 14 extending downwardly from the upper horizontal portions 13 and also outwardly extending horizontal portions 15 at the lower ends of said vertical spindles to receive the hubs of the rear ground wheels 16 as will be readily understood. Stop collars 17 are secured upon the axles 15 at opposite sides of the hubs of the wheels so that the wheels may be readily adjusted to the width of the rows. Longitudinal coupling bars 18 are extended between the ends of the plates or straps 12 and the front cross beam 3 and are rigidly secured thereto so as to firmly brace the frame and impart rigidity thereto. These longitudinal coupling bars may conveniently be formed of angle iron and their extremities are turned laterally, as shown at 19, so as to fit against the rear edge of the cross beam 3 and the front side of the forward plate or strap 12, as shown clearly in Fig. 2, securing bolts being passed through the said lateral extremities and the beam or the straps so as to rigidly connect the parts. It will be readily noted that the bolts by which the rear ends of the coupling bars 18 are connected to the straps 12 also secure the spindles 13 between the extremities of the straps 12. The rear axles are effectually braced and held against buckling by the forwardly-extending braces 20 having their rear ends secured to the vertical portions 14 of the axles and their front ends clamped to the coupling bars 18 and also by the braces 21 which have their forward ends clamped to the vertical spindles 14 and their rear ends secured to the rear ends of the main side bars 1. A seat standard 22 is secured upon the rear cross bar 2 and a seat 23 is carried by said standard. Braces 24 secured to the front beam 3 and the side beams 1, lend additional strength and rigidity to the frame.

Upon the underside of the front cross beam 3 at the center thereof and adjacent each end of the same, I secure a box or sleeve 25 and in each of said boxes or sleeves is slidably mounted a rod 26, the extremities of which receive and carry the front ends of the blade carrying frames 27. The frames 27 are each composed of mating side bars having their forward portions extended obliquely upward and forward, as shown at 28, and their rear ends bent laterally inward, as shown at 29, so as to meet at the center of the frame and then extend rearwardly, as shown at 30, the said rearwardly extending members being rigidly bolted together. The extremities of the upwardly extending portions 28 of these frames are laterally offset, as shown at 31, so that they may clear and fit over the extremities of the pins or rods 26 and thereby permit the use of a relatively long rod with a relatively narrow frame. The rearwardly extending portion or arm 30 of the blade-carrying frame may be bifurcated or forked, as shown at 32, to receive the lower extremity of a spring standard 33 which projects upwardly above the main frame, as clearly shown in Fig. 1, and the ends of the spring standard are connected by a chain 34 to which is attached the front end of a hand lever 35 fulcrumed upon a suitable bracket 36 carried by the rear frame bar 11. The bracket 36 is so constructed as to provide a rack 37 concentric with the fulcrum of the lever 35 and a latch 38 mounted on said lever is adapted to engage the said rack and thereby hold the lever in a set position. It will thus be readily seen that the frame 27 may be adjusted pivotally about the rod or pin 26 and the ground-treating members permitted to penetrate the soil to any desired depth. The several frames and the adjusting connections for the same are identical in form, but the several levers are disposed at different angles upon the rear frame bar 11 in order that all the levers may be readily reached and operated by a driver upon the seat 23.

The pins or rods 26 are slidably mounted in the boxes 25 so as to permit a lateral adjustment of the blade-carrying frames and, to effect this adjustment, I provide upon the side bars 1 horizontally disposed angle levers 39 which have their longitudinal arms projecting forwardly from their fulcrums and their lateral arms extending from the sides of the side bars 1 upon which they are fulcrumed. Links 40 connect the extremities of the transverse arms of the angle levers with hand levers 41 fulcrumed upon the side bars 1 near the rear ends thereof and equipped with latches 42 to engage racks 43 secured upon said side bars concentric with the fulcrums of the hand levers. The extremities of the longitudinal arms of the angle levers are each connected by a transverse link 44 with one of the blade-carrying frames and it will thus be seen that the frames may be independently adjusted transversely of the main frame so that the working instrumentalities carried by the said frames will be adjusted according to the widths of the rows and the spaces between the rows. The several links 44 are carried across the frames to which they are respectively attached and their free ends are formed into hooks 45 adapted to engage in eyes 46 provided upon the far side of the respective blade-carrying frame near the front end thereof. This arrangement of the links accommodates a wider movement of the angle levers than would be possible if said levers were connected with the near side of the blade-carrying frame and, therefore, permits a more accurate adjustment of the said frame.

I have illustrated rolling disks 47 as the ground-treating members and it will be noted that one disk is disposed adjacent the side of each frame and, therefore, arranged to act upon the soil at one side of one row. These disks 47 are carried by the lower ends of standards 48 which are provided at their upper ends with lateral flanges 49 clamped against the under side of a cross bar 50 which rests upon the members 27 of the blade-carrying frame. Hook bolts 51 fitted in the cross bar and engaging the under edge of the members 27 serve to secure the cross bar firmly to the said members and permit the bar to be adjusted to any point of the length thereof. The disks may also be adjusted toward or from the ends of the bar 50 and thereby regulated so as to accommodate a row of plants of any size. Upon reference to Fig. 2, it will be noted that there is a blade carrying frame disposed between the main longitudinal or side beams 1 of the main frame and also between each side beam 1 and the adjacent longitudinal coupling bar 18 so that three sets of blades or disks may be accommodated upon the main frame and three rows of plants worked at one time. The ground-treating members may be disposed in any desired relation to each other, but I prefer to have the central set of members disposed in rear of the side sets of members and have illustrated this arrangement in Fig. 2. By having the several sets of ground-treating members out of alinement transversely of the machine, I avoid interference of one set of members with the action of another set upon the soil.

My improved machine is very strong and durable and will be found highly efficient in use for the purposes for which it was designed.

Having thus described the invention, what is claimed as new is:

1. In a machine for the purposes set forth, the combination of a main frame consisting of longitudinal beams, cross beams secured to and extending laterally beyond said beams, a rolling support for the front end of said frame, the width of said support being less than the length of the cross beams, longitudinal coupling bars having their ends secured to the ends of the respectively adjacent cross beams, axle members secured to the ends of the rear cross beam, wheels mounted upon said axle members, braces secured to said axle and extending forwardly therefrom to the longitudinal coupling bars and secured thereto, and other braces secured to said axle members and extending rearwardly and inwardly therefrom and secured to the side beams of the main frame.

2. In a machine for the purpose set forth, the combination of a main frame, a bolster secured at its ends to the front end of the main frame at opposite sides of the center thereof, a brace secured at its rear end to the front end of the main frame at the center thereof in rear of the bolster, said brace extending downwardly and forwardly and across the center of the bolster and terminating in advance of the bolster, the brace and the bolster being intimately connected, a draft tongue having its rear end movable under and supporting the center of the bolster, a draft hook secured on the tongue and pivotally engaging the front end of the brace, an arched axle secured to said tongue under the bolster, wheels carried by the ends of said axle, and braces secured to the side members of the axle and to the draft tongue.

In testimony whereof I affix my signature.

CHARLES H. CLARK. [L. S.]